United States Patent [19]

Seres

[11] Patent Number: 4,617,752
[45] Date of Patent: Oct. 21, 1986

[54] DOWNRIGGER MOUNTING

[75] Inventor: Alex Seres, Frankfort, Mich.

[73] Assignee: Incoe Corporation, Troy, Mich.

[21] Appl. No.: 713,917

[22] Filed: Mar. 20, 1985

[51] Int. Cl.⁴ .............................................. A01K 89/00
[52] U.S. Cl. .................................. 43/27.4; 242/84.2 B
[58] Field of Search ................ 43/4, 21.2, 27.4, 43.12;
242/84.2 B, 84.2 R, 85, 86.5 A, 106; 248/291,
514, 528, 529, 533, 534; 211/70.8

[56]  References Cited
U.S. PATENT DOCUMENTS

| | | | |
|---|---|---|---|
| 2,672,301 | 3/1954 | Shelburne | 242/84.2 B |
| 3,719,331 | 3/1973 | Harsch | 242/106 |
| 3,937,415 | 2/1976 | Prinz | 242/106 |
| 4,004,366 | 1/1977 | Berry | 242/106 |
| 4,312,147 | 1/1982 | Christiansen | 43/27.4 |
| 4,411,395 | 10/1983 | Steffans | 242/84.2 B |

Primary Examiner—M. Jordan
Attorney, Agent, or Firm—Harness, Dickey & Pierce

[57] ABSTRACT

A downrigger fishing apparatus of the type including a standard and a post pivotally attached to the standard, the standard being provided with a stop, and locating means, and adapted to be mounted at a convenient location on a boat, the post being provided with a spring loaded detent and a mounting plate for the weighted-line reel, said detent and said plate being mutually cooperative with said stop in one pivotal position of said post to hold the latter securely but releasably in an operative position, and said plate being additionally coactive with said locating means in an inoperative position of said post to position the same in said inoperative position.

8 Claims, 3 Drawing Figures

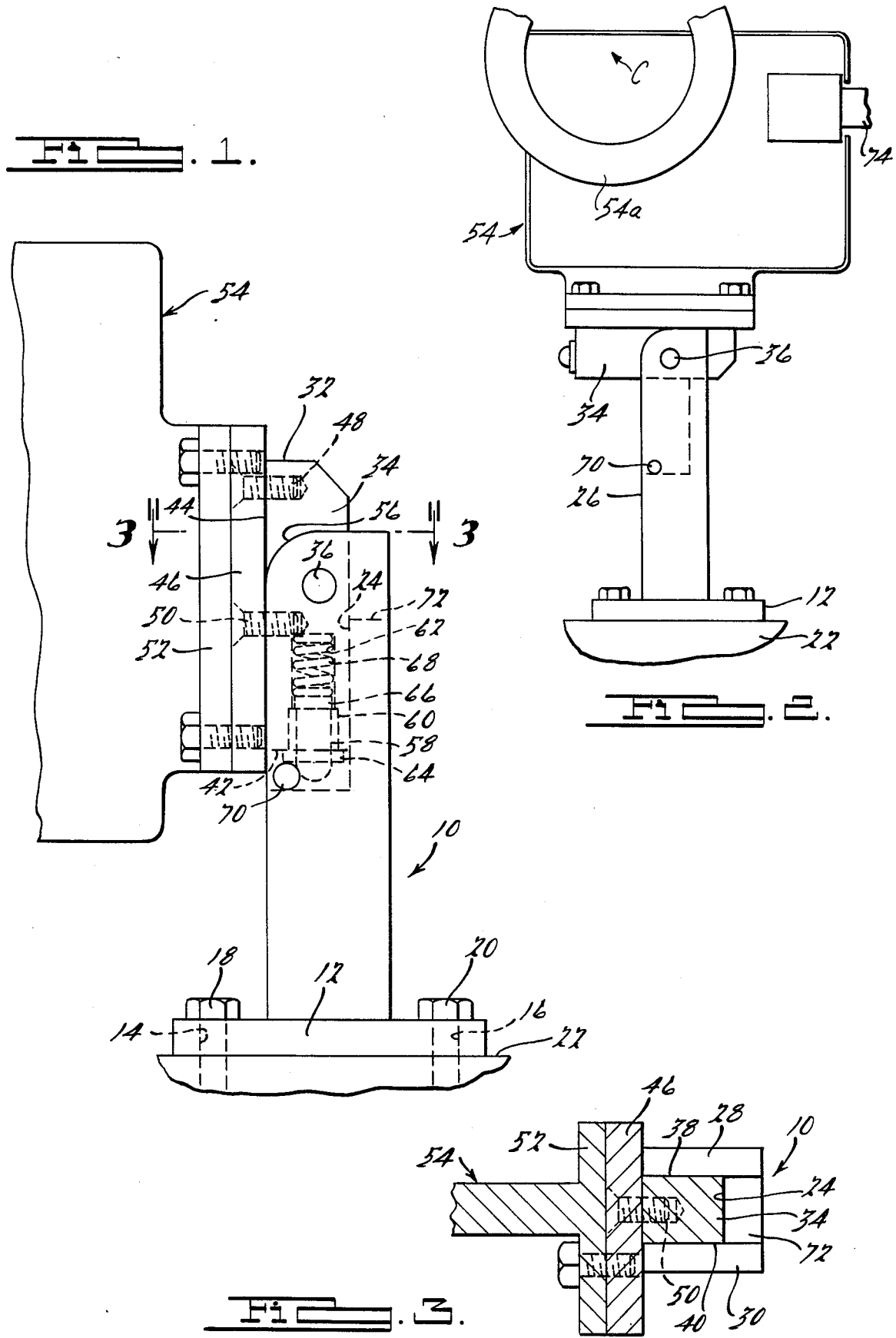

DOWNRIGGER MOUNTING

STATEMENT OF THE INVENTION

This invention relates to new and useful improvements in downrigger fishing apparatus of the type having separate reels for carrying a fishing line and a weighted-line respectively.

BACKGROUND OF THE INVENTION

A problem arises in the use of downrigger fishing equipment of the type having separate reels for carrying a fishing line and a weighted-line, respectively, in that, when a fish strikes the lure at the end of the fishing line, the latter separates physically from the weighted-line; and the weighted-line must then be reeled in promptly while the fish is still on the fishing line in order to prevent the two lines from becoming tangled. Ideally, the reel for the weighted-line should be mounted and arranged so that the weighted-line can be reeled in as quickly as possible after the fish strikes the lure and the reel then swung or otherwise moved to an inoperative position where it is out of the way of both the fisherman and the fishing line. At the same time the mounting for the weighted-line reel must be readily accessible to the fisherman in both the operative and inoperative positions.

Another significant factor bearing on the practicality of the situation is that the portion of the apparatus carrying the weighted-line reel must not only be readily and quickly movable between operative and inoperative positions but it must also be capable of holding the fishing line and the weighted-line in essentially close proximity ot each other at a point near the reels but the mounting for the weighted-line reel must also be movable manually easily and quickly between the operative and the inoperative positions. At the same time, the mounting for the weighted-line reel must be relatively simple in construction and inexpensive to manufacture if it is not to be priced out of the marketplace.

SUMMARY OF THE INVENTION

According to the present invention, the mounting for the weighted-line reel comprises only two main components; viz., a standard that is adapted for attachment to the boat at some convenient location, as on the gunnel for example, and a post sub-assembly that is pivotally attached to the standard and is manually manipulatable about the pivot attachment between the inoperative, out of the way position and the operative position in which it holds the line coming off the reel in close proximity and essentially parallel to the fishing line. To this end, the post sub-assembly includes a spring loaded detent; and a mounting plate for the weighted-line reel. In practice, the post component preferably is mounted in an open ended slot provided in the standard at one side thereof; and the mounting plate for the weighted line reel has projecting portions that overlay the mentioned side of the standard at opposite sides of the slot and mutually cooperate with the detent to hold the post securely but releasably with its associated reel in the operative position. Either the post or the reel preferably carries an elongate handle that is manually operable to disengage the detent from the stop so that the post can be swung easily and quickly to the inoperative position as soon as the detent is disengaged from the stop. By the same token, the post can just as easily be swung back into the slot to return the weighted-line reel to the operative position and to re-engage the detent with the stop to position and hold the weighted-line coming off the reel properly with respect to the fishing line so that the two lines can be releasably interconnected in the conventional manner. Thus, the mounting plate and the detent mutually cooperate in the use of the equipment when the weighted-line reel is operatively positioned to hold the weighted-line always in proper association with the fishing line. However, the projecting portions of the mounting plate also move into engagement with a suitable other locating surface on the standard when the post is moved to the inoperative position. Since both the detent and the reel mounting plate are attached to and carried by the post, these three elements can be easily and quickly assembled as a sub-assembly, and the latter can be readily adapted to the standard as a unit at final assembly of the apparatus. Thus, the particular arrangement described minimizes the manufacturing cost of the apparatus.

DESCRIPTION OF THE DRAWINGS

FIG. 1 is a side elevational view showing parts broken away of a downrigger fishing apparatus embodying the invention which shows the post and its associated parts, including the weighted-line reel, a fragmentary portion only of which is shown in the operative position;

FIG. 2 is a view similar to FIG. 1 but showing the post and its associated parts in the inoperative position; and FIG. 3 is a transverse sectional view taken on the line 3—3 of FIG. 1.

DESCRIPTION OF THE PREFERRED EMBODIMENT

In the drawing, wherein for the purpose of illustration is shown a preferred embodiment of the invention, the numeral 10 designates a standard that is adapted to be mounted on and fastened securely to a boat at some convenient location such as on a gunnel at or adjacent to the rear of the boat. To this end, the standard 10 is provided with a base plate 12 that projects laterally thereof; and the projecting portions of the base plate are provided with holes 14 and 16 that accept screws 18 and 20 which fasten the standard securely in an upright position on the gunnel or other part of the boat designated generally by the numeral 22. The particular standard here shown is of rectangular configuration in transverse section. A longitudinal, open-ended slot 24 is provided in the side 26 and extends along the upper portion of side 26 substantially midway between the adjacent sides 28 and 30 of the standard. It also opens through the top 32 of the standard.

A post 34 attached to the standard 10 by a pivot 36 also is of substantially rectangular configuration in transverse section; and the opposite sides 38 and 40 of the post fit snugly but movably between the opposed confronting sides of the slot 24 so that the post is freely swingable on the pivot 36 between the vertical operative position shown in FIG. 1 and the horizontal inoperative position shown in FIG. 2. The upper portion of the post 34 projects through the open top of the slot 24 and extends above the top 26 of the standard 10, and the lower end 42 of the post terminates short of the bottom of the slot 24 so as not to interfere with pivotal movement of the post on the pivot 36 in the manner herinabove described. The outer side 44 of the post 34 is disposed flush with the side 26 of the standard 10; and a mounting plate 46 for the weighted-line reel is fastened to the side 44 by screws 48 and 50. The side marginal portions of the mounting plate 46 project laterally of the post 34 and the laterally projecting marginal side portions seat against the confronting side 26 of the standard 10 at opposite sides of the slot 24 when the post 34 is in the upright position shown in FIG. 1 to hold the post upright and to close the open side of the slot 24. The laterally projecting marginal side portions of the mounting plate 46 assure a relatively large seating surface for the base 52 of a conventional weighted-line reel assembly generally by the numeral 54 which includes a conventional reel 54a with axis of rotation through the center C. In order to permit free rotative movement of the post 34 and the mounting plate 46 as well as the reel assembly 54 carried by the mounting plate, the upper front corner of the standard 10 is rounded or curved, as shown at 56, about a radius coincident with the center of the pivot 36 so as not to interfere with the movement of the post 34 between the upright operative position and the horizontal inoperative position.

The post 34 and the reel assembly 54 carried thereby and associated therewith are securely but releasably held in the operative upright position by a detent 58 which is slidably mounted in a sleeve 60 that is press-fitted into or otherwise secured in a longitudinal bore 62 that extends centrally into the post from the lower end 42 thereof. As shown in FIG. 1, the sleeve 60 is provided at the lower end thereof with a radial flange 64 that seats against the lower end of the post 34; and the detent 58 is provided with a radial flange 66 that is normally seated on the inner end of the sleeve by the resilient action of a helical spring 68 that is confined between the bottom of the bore 62 and the inner end of the detent, as perhaps best shown in FIG. 1. The detent 58 extends below the sleeve 60; and the projecting portion thereof is spherically curved so that, under sufficient pressure, it rides over a stop in the form of a cross pin that is provided in the standard 10 transversely of the slot 24 adjacent to the bottom of the latter and the front side 28 of the standard 10. In use, when the post 34 is swung counterclockwise on the pivot 36 to the vertical, operative position shown in FIG. 1, the detent 66 engages the stop 70 as the post approaches the fully vertical position and retracts against the resilient action of the spring 68 to permit the detent to ride over the spot. In the fully upright position of the post 34, the projecting lateral portions of the mounting plate 46 seat against the front side 28 of the standard 10 to limit further counterclockwise rotation of the post 34; and the detent 58 seats against the stop pin 70 in opposition to the mounting plate 46 so that the latter and the detent mutually cooperate to hold the post securely but releasably in the upright position. Contrariwise, when the post 34 is swung clockwise on the pivot 36 to the horizontal inoperative position shown in FIG. 2, the detent 58 rides over the stop pin 70 against the resilient action of the spring 68 to release the post during the initial portion of the clockwise rotation and to permit easy movement thereof to the inoperative horizontal position. In this connection, it will be readily apparent that the upper portion of the standard 10 at the back of the slot 24 is cut away as indicated at 72 to permit the post 34 to move to the fully horizontal position and the laterally projecting portions of the mounting plate 46 to seat against the top 32 of the standard to stabilize the post and to support the weight of the reel assembly 54 in the horizontal position.

In practice, the line carried by the reel assembly 54 carries a weight, sometimes referred to as a "Cannonball", of sufficient size to hold the weighted-line carried by the reel as well as the fishing line that is releasably attached to the weighted-line and the lure at the end of the fishing line at a desired depth when the boat to which the rig is attached is moving at trolling speed. When a fish strikes the lure, the fishing line releases automatically from the weighted-line; and it is necessary at that time to reel in the weighted-line promptly in order to prevent the two lines from becoming tangled. As the weighted-line is reeled in, the reel assembly 54 is swung from the vertical position shown in FIG. 1 to the horizontal position shown in FIG. 2 so that the reel assembly and the weighted-line is out of the way of the fishing line.

Since the resistance of the spring loaded detent 58 and the drag of the weighted-line in the water offers considerable resistance to the pivotal movement of the reel assembly 54 from the vertical to the horizontal position, the reel assembly 54 conventionally is provided with a manually actuated handle 74 that may be three or four feet long to assure sufficient leverage to facilitate release of the detent and movement of the reel assembly to the horizontal position against the drag of the weighted-line.

From the foregoing, it will be readily apparent that the combined action of the detent 58 against the stop 70 and the engagement of the mounting plate 46 against the front side surface of the standard 10 are sufficient to hold the post 34 and the parts carried thereby in the normal operative upright position and that, in this position of the post, the overlapping relation between the mounting plate 46 and side face 28 of the standard 10 at opposite sides of the slot 24 shields and protects the post and other moving parts disposed within the slot. Also, the disposition of the detent 58 in the lower portion of the post 34 and the manner in which it is retained in the bore 62 by the sleeve 62 makes it possible to manufacture the post and the detent components as a complete sub-assembly which in turn makes it possible to manufacture the entire mounting in two major parts. This feature minimizes manufacturing cost and facilitates assembly of the two parts at final assembly since this requires only positioning of the post 34 in the slot and insertion of the pivot pin 36.

I claim:

1. In a downrigger fishing apparatus of the type having separate reels for carrying a fishing line and a weighted-line respectively, the weighted-line reel having an axis of rotation.

mounting means for the reel that carries the weighted-line, said mounting means including a standard adapted to be mounted at a convenient location on a boat, said standard having a stop, and locating means;

a post pivotally attached to said standard for pivotal movement between operative and inoperative positions, said pivotal movement being about an axis parallel to said weighted-line reel axis and provided with a spring loaded detent, and a mounting plate for the weighted line reel, said detent and said plate being mutually cooperative with said stop in a predetermined operative position of said post to hold the latter securely but releasably in said operative position, and said plate being additionally coactive with said locating means in a predetermined operative position of said post to dispose said post in said predetermined inoperative position.

2. A downrigger fishing apparatus as defined by claim 1 wherein said post, said detent, and said mounting plate comprise a self-contained sub-assembly.

3. A downrigger fishing apparatus as defined by claim 1 wherein the pivotal attachment between said standard and said post is disposed to position said detent in pressed engagement with said stop in opposed relation to said mounting plate when the latter is in engagement with said locating means.

4. A downrigger fishing apparatus as defined by claim 3 wherein said mounting plate has projecting portions engageable with said locating means in each of said operative position and said inoperative position, and
   wherein said detent engages said stop means in the operative position of said post to hold the projecting portions of said mounting plate securely but releasably in engagement with said locating means.

5. A downrigger fishing apparatus as defined by claim 4 wherein said locating means comprises separate locating surfaces on said standard,
   wherein said projecting portions of said mounting plate are engageable with one of said locating surfaces simultaneously with said detent when said post is in the operative position, and wherein the projecting portions of said mounting plate are engageable with another of said locating surfaces independently of said detent when said post is in said inoperative position.

6. A downrigger fishing apparatus as defined by claim 5 wherein said post is mounted in an open ended longitudinal slot provided in said standard at one side thereof, and
   wherein one of said locating surfaces are defined by said side at opposite sides of said slot,
   whereby said plate and the projecting portions thereof close said slot at the mentioned side of said standard when said post is in the operative position.

7. In a downrigger fishing apparatus of the type having separate reels for carrying a fishing line and a weighted-line repsectively,
   mounting means for the reel that carries the weighted-line, said mounting means including
   a standard adapted to be mounted at a convenient location on a boat, said standard having a stop, and locating means;
   a post pivotally attached to said standard and provided with a spring loaded detent, and a mounting plate for the weighted line reel, said detent and said plate being mutually cooperative with said stop in a predetermined operative position of said post to hold the latter securely but releasably in said operative position, and said plate being additionally coactive with said locating means in a predetermined operative position of said post to dispose said post in said predetermined inoperative position;
   wherein the pivotal attachment between said standard and said post is disposed to position said detent in pressed engagement with said stop in opposed relation to said mounting plate when the latter is in engagement with said locating means;
   wherein said mounting plate has projecting portions engageable with said locating means in each of said operative position and said inoperative position;
   wherein said detent engages said stop means in the operative position of said post to hold the projecting portions of said mounting plate securely but releasably in engagement with said locating means;
   wherein said locating means comprises separate locating surfaces on said standard; and
   wherein said projecting portions of said mounting plate are engageable with one of said locating surfaces simultaneously with said detent when said post is in the operative position, and wherein the projecting portions of said mounting plate are engageable with another of said locating surfaces independently of said detent when said post is in said inoperative position.

8. A downrigger fishing apparatus as defined by claim 7 wherein said post is mounted in an open-ended longitudinal slot provided in said standard at one side thereof, and
   wherein one of said locating surfaces are defined by said side at opposite sides of said slot,
   whereby said plate and the projecting portions thereof close said slot at the mentioned side of said standard when said post is in the operative position.

* * * * *